(12) United States Patent
Zack et al.

(10) Patent No.: US 9,382,139 B2
(45) Date of Patent: Jul. 5, 2016

(54) METHOD OF DISSOLVING AND/OR INHIBITING THE DEPOSITION OF SCALE ON A SURFACE OF A SYSTEM

(75) Inventors: Kenneth L. Zack, Wyandotte, MI (US); Joseph P. Borst, Plymouth, MI (US); David Durocher, Westland, MI (US); David E. Przybyla, Southgate, MI (US); Victor Leung, Madison, NJ (US); Gunter Decker, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 286 days.

(21) Appl. No.: 13/446,292

(22) Filed: Apr. 13, 2012

(65) Prior Publication Data

US 2012/0260938 A1    Oct. 18, 2012

Related U.S. Application Data

(60) Provisional application No. 61/475,531, filed on Apr. 14, 2011, provisional application No. 61/494,132, filed on Jun. 7, 2011.

(51) Int. Cl.
| | |
|---|---|
| *C23G 1/00* | (2006.01) |
| *C23G 1/02* | (2006.01) |
| *B08B 7/00* | (2006.01) |
| *B08B 3/00* | (2006.01) |
| *C02F 1/68* | (2006.01) |
| *C02F 5/12* | (2006.01) |
| *C11D 3/00* | (2006.01) |
| *C11D 3/04* | (2006.01) |
| *C11D 3/20* | (2006.01) |
| *C11D 3/33* | (2006.01) |
| *C11D 3/34* | (2006.01) |
| *C11D 7/08* | (2006.01) |
| *C11D 7/26* | (2006.01) |
| *C11D 7/32* | (2006.01) |
| *C11D 7/34* | (2006.01) |
| *C11D 11/00* | (2006.01) |
| *C23G 1/26* | (2006.01) |

(52) U.S. Cl.
CPC . *C02F 1/683* (2013.01); *C02F 5/12* (2013.01); *C11D 3/0073* (2013.01); *C11D 3/042* (2013.01); *C11D 3/2086* (2013.01); *C11D 3/33* (2013.01); *C11D 3/3409* (2013.01); *C11D 7/08* (2013.01); *C11D 7/265* (2013.01); *C11D 7/3245* (2013.01); *C11D 7/34* (2013.01); *C11D 11/0029* (2013.01); *C11D 11/0041* (2013.01); *C23G 1/26* (2013.01)

(58) Field of Classification Search
None
See application file for complete search history.

(56) References Cited

U.S. PATENT DOCUMENTS

| | | | |
|---|---|---|---|
| 5,607,911 A | 3/1997 | Levin et al. | |
| 5,672,578 A * | 9/1997 | Carrie et al. | 510/245 |
| 5,762,821 A * | 6/1998 | Tate | 252/180 |
| 5,786,313 A | 7/1998 | Schneider et al. | |
| 5,858,245 A | 1/1999 | Gallup | |
| 6,207,025 B1 * | 3/2001 | Eiermann et al. | 204/157.78 |
| 6,310,024 B1 | 10/2001 | Gill et al. | |
| 6,531,629 B1 | 3/2003 | Eiermann et al. | |
| 7,638,469 B2 | 12/2009 | Heidenfelder et al. | |
| 7,857,911 B2 | 12/2010 | Varrin, Jr. et al. | |
| 8,227,398 B2 | 7/2012 | Kany et al. | |
| 2007/0034606 A1 | 2/2007 | Dietsche et al. | |
| 2007/0203049 A1 | 8/2007 | Thomson | |
| 2008/0069986 A1 | 3/2008 | Clifton et al. | |
| 2008/0161591 A1 | 7/2008 | Richards | |
| 2009/0105114 A1 | 4/2009 | Stolte et al. | |
| 2009/0305934 A1 | 12/2009 | Creamer et al. | |
| 2009/0324839 A1 | 12/2009 | Klippel et al. | |
| 2010/0000579 A1 * | 1/2010 | Reinbold et al. | 134/34 |
| 2010/0276152 A1 | 11/2010 | De Wolf et al. | |
| 2012/0279711 A1 | 11/2012 | Collins et al. | |

FOREIGN PATENT DOCUMENTS

| | | |
|---|---|---|
| CA | 2379219 A1 | 1/2001 |
| CN | 1300812 A | 6/2001 |
| CN | 1712143 A | 12/2005 |
| CN | 1753945 A | 3/2006 |
| CN | 1860256 A | 11/2006 |
| CN | 1934290 A | 3/2007 |
| CN | 101048488 A | 10/2007 |

(Continued)

OTHER PUBLICATIONS

Li, Kang. Ceramic membranes for Separation and Reaction. England, John Wiley & Sons, Ltd, 2007. Google Books. Web. Jan. 5, 2015.*

(Continued)

*Primary Examiner* — Eric Golightly
*Assistant Examiner* — Arlyn I Rivera-Cordero
(74) *Attorney, Agent, or Firm* — Howard & Howard Attorneys PLLC

(57) ABSTRACT

A method of dissolving and/or inhibiting the deposition of scale on a surface of a system comprises the step of bringing the surface of the system into contact with a composition. The composition can comprise from about 3 to about 15 parts by weight of a chelating component. The chelating component is selected from the group of MGDA, NTA, HEDTA, GLDA, EDTA, DTPA, and mixtures thereof. The composition can further comprise from about 3 to about 15 parts by weight of an acidic component, which is different than the chelating component. The composition can further comprise at least about 60 parts by weight of water. Each of the parts by weight ranges above are based on 100 parts by weight of the composition. The composition may further comprise a surfactant component and/or a corrosion inhibitor.

29 Claims, No Drawings

(56) References Cited

FOREIGN PATENT DOCUMENTS

| | | | |
|---|---|---|---|
| CN | 101389707 A | 3/2009 | |
| CN | 101597549 A | 12/2009 | |
| CN | 101918510 A | 12/2010 | |
| DE | 19932766 A1 | 1/2001 | |
| EA | 200701784 A1 | 4/2008 | |
| EP | 0 541 318 A1 | 5/1993 | |
| FR | 2 774 371 A1 | 8/1999 | |
| FR | 2955332 A1 | 7/2011 | |
| JP | S 56-013486 A | 2/1981 | |
| JP | H 05-222555 A | 8/1993 | |
| JP | 2000-263088 A | 9/2000 | |
| JP | 2001-342453 A | 12/2001 | |
| JP | 2002-035789 A | 2/2002 | |
| JP | 2003-047991 A | 2/2003 | |
| JP | 2007-531821 A | 11/2007 | |
| JP | 2010-077340 A | 4/2010 | |
| WO | WO 2007/098308 A1 | 8/2007 | |
| WO | WO 2010/045686 A1 | 4/2010 | |

OTHER PUBLICATIONS

Waldhoff, Heinrich et al., Handbook of Detergents, Surfactant science series vol. 123. Florida: Taylor & Francis Group 2004, Google Books. May 21, 20115.*

English language abstract for DE 19932766 extracted from the espacenet.com database on Sep. 10, 2012, 8 pages.

English language abstract and machine-assisted translation for FR 2955332 extracted from the espacenet.com database on Sep. 10, 2012, 20 pages.

International Search Report for Application No. PCT/US2012/033496 dated Jul. 31, 2012, 3 pages.

Machine-Assisted English translation for CN 1300812 extracted from the espacenet.com database on Jan. 8, 2015, 66 pages.

English language abstract and machine-assisted English translation for CN 1712143 extracted from the espacenet.com database on Jan. 8, 2015, 18 pages.

Machine-Assisted English translation for CN 1753945 extracted from the espacenet.com database on Jan. 8, 2015, 97 pages.

English language abstract and machine-assisted English translation for CN 1860256 extracted from the espacenet.com database on Jan. 8, 2015, 72 pages.

English language abstract for CN 1934290 extracted from the espacenet.com database on Jan. 8, 2015, 2 pages.

English language abstract for CN 101389707 extracted from the espacenet.com database on Jan. 8, 2015, 1 page.

English language abstract for CN 101597549 extracted from the espacenet.com database on Jan. 8, 2015, 1 page.

English language abstract for CN 101918510 extracted from the espacenet.com database on Jan. 8, 2015, 1 page.

Chemical Book, Nitrilotriacetic acid, CAS#: 139-13-9, extracted from http://www.chemicalbook.com/ChemicalProductProperty_EN_CB9241989_htm on Sep. 9, 2015, 3 pages.

Dojindo, DTPA, CAS#: 67-43-6, extracted from http://www.dojindo.com/store/p/739-DTPA.html on Sep. 9, 2015, 1 page.

OpenWetWare, EDTA, extracted from http://openwetware.org/wiki/EDTA on Sep. 9, 2015, 3 pages.

English language abstract not found for JPH 05-222555; however, see English language equivalent EP 0 541 318. Original document extracted from espacenet.com database on Feb. 25, 2016, 4 pages.

English language abstract and machine-assisted English translation for JP 2002-263088 extracted from espacenet.com database on Feb. 25, 2016, 17 pages.

English language abstract not found for JP 2007-531821; however, see English language equivalent U.S. Pat. No. 7,857,911. Original document extracted from espacenet.com database on Feb. 25, 2016, 14 pages.

English language abstract and machine-assisted English translation for JPS 56-013486 extracted from the PAJ database on Mar. 23, 2016, 5 pages.

English language abstract and machine-assisted English translation for JP 2001-342453 extracted from espacenet.com database on Mar. 23, 2016, 34 pages.

English language abstract and machine-assisted English translation for JP 2002-035789 extracted from the PAJ database on Mar. 23, 2016, 4 pages.

English language abstract and machine-assisted English translation for JP 2003-047991 extracted from the PAJ database on Mar. 23, 2016, 6 pages.

English language abstract and machine-assisted English translation for JP 2010-077340 extracted from espacenet.com database on Mar. 23, 2016, 66 pages.

English language abstract for CN 101048488 extracted from espacenet.com database on Apr. 11, 2016, 1 page.

English language abstract for EA 200701784 extracted from espacenet.com database on May 11, 2016, 1 page.

English language abstract and machine-assisted English translation for FR 2 774 371 extracted from espacenet.com database on May 11, 2016, 10 pages.

* cited by examiner

METHOD OF DISSOLVING AND/OR INHIBITING THE DEPOSITION OF SCALE ON A SURFACE OF A SYSTEM

CROSS REFERENCE TO RELATED APPLICATIONS

This application claims the benefit of U.S. Provisional Patent Application Ser. No. 61/475,531, filed on Apr. 14, 2011, and U.S. Provisional Patent Application Ser. No. 61/494,132, filed on Jun. 7, 2011, both of which are incorporated herewith in their entirety.

FIELD OF THE INVENTION

The present invention generally relates to a method of dissolving and/or inhibiting the deposition of scale on a surface of a system by applying a composition to the surface of the system, with the composition comprising a chelating component, an acidic component, and water, and optionally, a surfactant component and/or a corrosion inhibitor.

DESCRIPTION OF THE RELATED ART

During many industrial processes, such as those utilizing heat exchangers, there is often a build up of scale. The progressive build up of scale inhibits heat transfer, water flow, etc. in the process and requires costly, labor intensive, and time consuming removal practices. Such practices may result in increased health and safety issues. Furthermore, such practices result in considerable down time required to successfully remove the scale, which leads to losses in productivity and profit.

Some methods of scale removal include in-place cleaning methods, such as those relying on pH swings/inversions provided by utilizing acidic solutions followed by basic solutions. However, such solutions are very caustic as they include high amounts of acids and bases in order to attack and remove the scale. In addition, some methods also utilize components which are harmful to the environment.

As such, there remains an opportunity to provide improved methods for removing scale from systems. There also remains an opportunity to provide improved compositions for removing scale from systems.

SUMMARY OF THE INVENTION AND ADVANTAGES

The subject invention provides a method of dissolving and/or inhibiting the deposition of scale on a surface of a system. The method comprises the step of bringing the surface of the system into contact with a composition. In certain embodiments, the composition comprises from about 3 to about 15 parts by weight of a chelating component. The chelating component is selected from the group of methylglycine-N—N-diacetic acid (MGDA) and/or an alkali salt thereof, nitrilotriacetic acid (NTA) and/or an alkali salt thereof, hydroxyethylethylenediaminetriacetic acid (HEDTA) and/or an alkali salt thereof, N,N-bis(carboxymethyl)-L-glutamate (GLDA) and/or an alkali salt thereof, ethylenediaminetetraacetic acid (EDTA) and/or an alkali salt thereof, diethylenetriaminepentaacetic acid (DTPA) and/or an alkali salt thereof, and mixtures thereof. The composition further comprises from about 3 to about 15 parts by weight of an acidic component, which is different than the chelating component. The composition further comprises at least about 60 parts by weight of water. The composition may further comprise a surfactant component. The composition may further comprise a corrosion inhibitor. Each of the parts by weight ranges above are based on 100 parts by weight of the composition. Other embodiments of the composition are also provided.

The present invention generally provides an excellent method of removing scale from the system. The composition has excellent scale removal properties and is ecologically friendly. The composition is also easier to handle and use relative to other conventional compositions.

DETAILED DESCRIPTION OF THE INVENTION

The present invention provides a method of dissolving and/or inhibiting the deposition of scale on a surface of a system. Typically, the method is at least useful for dissolving scale on the surface of the system, and can also be useful for inhibiting the redeposition of scale on the surface of the system, if such a problem arises. The scale may also be referred to in the art as foul/fouling.

The surface of the system is typically formed of a metal or an alloy, such as iron, steel, aluminum, chromium, copper, or a combination thereof. A specific example of a surface is one formed from a galvanized metal, such as galvanized metal, such as galvanized steel. The present invention is especially useful for use with such surfaces. It is to be appreciated that the surface can be formed from other materials as well, such as a composite, a rubber, a plastic, a ceramic, etc. The surface may be an inner or an outer surface of the system. Examples of inner surfaces include those found in pipelines, boilers, in chemical plants or the like. Specific examples of inner surfaces include rubber lined vessels, e.g. rubber lined storage tanks. Examples of outer surfaces include those found on evaporators, conveyors, in manufacturing plants, in households, or the like.

Typically, the system is one in which the build up of scale is problematic. As such, the system can be of various types, such as being a heat-transfer system, a filtration system, an evaporation system, etc. Further examples of surfaces/systems include, but are not limited to, turbines, ship hulls, solar panels, reverse osmosis membranes, heating elements, reactors, petroleum reservoirs, water wells, geothermal wells, gas wells, and oil wells. The system can be in an industrial, commercial, or residential setting.

The scale can be made of up various components, depending on the type of system. For example, a heat-transfer system may include scale typically encountered with use of hard water, whereas an evaporation system may include scale stemming from the product being dried, e.g. a fertilizer. Examples of scale include crystals of solid salts, oxides, and hydroxides from water solutions (e.g. calcium carbonate and calcium sulfate), corrosion/rust, beerstone, milkstone, vegetable stone, phosphates, lime, silicates, etc. A specific example of scale is calcium oxalate, which may be encountered in various instances, such as in paper mills or with the manufacture of beer. Other types of scale may be those which are encountered during mining, such as scale that may arise during the mining of phosphate.

In one embodiment, the scale includes a combination of components, including ferrous phosphate, potassium fluorosilicate, potassium fluoride, and silica potassium hexafluorosilicate. Elements in the scale may include C, O, P, Si, S, K, and Fe. The scale may include lesser amounts of F, Mg, Al, Na, Ca, and Ti. It is to be appreciated, as described above, that the scale can be made up of various components. In addition, even though the system may be the same day to day, the scale on the surface of the system may change over time. For example, fluctuations in the materials used in the system can affect the amount and distribution of components that form the scale.

The method of the present invention comprises the step of bringing the surface of the system into contact with a composition. The composition can be brought into contact with the surface by various methods, such as by applying the composition to the surface, e.g. by dipping the surface in the composition, spraying the composition on the surface, rolling the composition on the surface, etc. Various application apparatuses understood in the art can be employed, such as a spraying apparatus, a dip tank, etc. It is efficient to apply the composition to the surface such that it is directed primarily toward the scale rather than on surface that lacks scale. The composition can also be flowed onto and/or past the surface, such as in a pipeline.

Typically, the surface does not need to be pretreated, such as being mechanically cleaned by scrapping, scrubbing, etc., prior to bringing the composition into contact with the surface. However, such pretreatment steps may be employed to expedite removal of the scale from the surface of the system. If the surface is an internal surface, such as those found in pipelines, the scale can be removed by filling the system with the composition, and optionally, circulating the composition in the system, e.g. by pumping. The surface can also be prewashed, such as with water, in order to remove other residues prior to bringing the composition into contact with the scale/surface.

The method may further comprise the step of applying heat to the composition and/or the system. The step is useful for expediting dissolution of the scale from the surface of the system. However, it is to be appreciated that the composition may also be brought into contact with the scale at room temperature. Generally, increasing temperature of the composition, either directly or indirectly, will accelerate the rate at which the scale is dissolved by the composition once contacted. Heating can be accomplished by various means understood in the art. For example, the composition can be heated in the system by heating means already present in the system. Optionally, a separate heat exchanger can be used to heat the composition.

Generally, at least a portion, if not all, of the scale is removed from surface of the system. Typically, the longer the composition is in contact with the surface, the greater the amount of scale removed from the surface. Removal can be increased via agitation of the composition when in contact with the surface, such that the composition also physically removes the scale (e.g. by shear) in addition to chemically removing the scale. Agitation can be accomplished via the circulation as described above or by other means understood in the art.

The composition of the present invention comprises a chelating component. The chelating component may comprise one or more chelating agents understood in the art. The chelating agent may also be referred to in the art as a complexing agent. In certain embodiments, the chelating component comprises methylglycine-N—N-diacetic acid (MGDA) and/or an alkali salt thereof, more typically the alkali salt thereof, e.g. methylglycine diacetate, trisodium salt ($Na_3$.MGDA). MGDA is also commonly referred to in the art as methylglycine diacetate. It is to be appreciated that as described herein, the alkali salt may include any alkali or alkaline earth metal and is not particularly limited.

In other embodiments, the chelating component comprises at least one of nitrilotriacetic acid (NTA), hydroxyethylethylenediaminetriacetic acid (HEDTA), N,N-bis(carboxymethyl)-L-glutamate (GLDA), ethylenediaminetetraacetic acid (EDTA), diethylenetriaminepentaacetic acid (DTPA), and/or an alkali salt thereof of any of the proceeding chelating agents. It is to be appreciated that the chelating component can comprise a combination or mixture of two or more of the chelating agents described herein, e.g. MGDA and GLDA. It is also to be appreciated that the acronyms used herein, e.g. MGDA, can refer to either the acid or salt form, e.g. $Na_3$.MGDA, of the chelating agent.

Typically, the chelating component is aqueous, such that the chelating component also includes water in addition to the chelating agent. In various embodiments, the chelating component is aqueous and such that the chelating agent, e.g. MGDA, is present in the chelating component in amounts of from about 35 to about 95, from about 35 to about 85, or from about 35 to about 45, or about 40, parts by weight, each based on 100 parts by weight of the chelating component. It is to be appreciated that the chelating component may also be in the form of a powder or a gel, such that the chelating agent is the chelating component.

Non-limiting examples of suitable chelating components are commercially available from BASF Corporation of Florham Park, N.J., under the trade name TRILON®, such as TRILON® M, TRILON® A, TRILON® B, TRILON® C, and TRILON® D. Further non-limiting examples of suitable chelating components are commercially available from AkzoNobel of Chicago, Ill., under the trade name DISSOLVINE® GL, such as DISSOLVINE® GL 47 S. Other non-limiting examples of suitable chelating components are described in U.S. Pat. No. 5,786,313 to Schneider et al. and in U.S. Pat. App. Pub. No. 2009/0105114 to Stolte et al., the disclosures of which are incorporated herein by reference in their entirety to the extent that the disclosures do not conflict with the general scope of the present invention described herein.

The chelating component is present in the composition in an amount of from about 0.001 to about 15 parts by weight, about 0.01 to about 15, about 0.1 to about 15, about 1 to about 15, about 3 to about 15, about 5 to about 12.5, about 7.5 to about 12.5, about 8.7 to about 14.5, about 5, or about 10, parts by weight, each based on 100 parts by weight of the composition. Typically, the amounts described herein are based on the assumption that the chelating component includes 100% actives, i.e., 100% chelating agent. As such, if the chelating component is aqueous, the amounts above can be adjusted accordingly to compensate for % actives dilution.

The chelating component is useful for inactivating hardness minerals and/or metallic ions stemming from the scale. Typically, the chelating agent will combine with hardness minerals and hold them in solution such that the hardness minerals cannot redeposit.

The composition further comprises an acidic component. Typically, the acidic component is selected from the group of an organic acid, an inorganic acid, and a combination thereof. Examples of suitable organic acids include straight chain or branched carboxylic acids including, but not limited to, lactic acid, acetic acid, formic acid, ascorbic acid, oxalic acid, hydroxymaleic acid, methanesulphonic acid, mandelic acid, glycolic acid, salicylic acid, a pyranosidyl acid such as glucuronic acid or galacturonic acid, citric acid, tartaric acid, pamoic acid, alginic acid, gentisic acid, lactobionic acid, succinic acid, polymers of maleic acid and acrylic acid, and copolymers thereof. Examples of suitable inorganic acids include hydrochloric acid, hypochlorous and chlorous acid, sulfuric acid, sulphurous acid, nitric acid, phosphoric acid, amidosulfonic/sulfamic acid, and phosphorous acid.

In certain embodiments, the acidic component comprises an organic sulfonic acid, such as an alkylsulfonic acid, e.g.

methanesulfonic acid (MSA). Methanesulfonic acid is a strong organic acid that is completely non-oxidizing and thermally stable that forms highly soluble salts. In other embodiments, the acidic component comprises citric acid. In further embodiments, the acidic component comprises phosphoric acid. It is to be appreciated that the acidic component can include two or more different acids, such as methanesulfonic acid and phosphoric acid. If two or more acids are included, they can be in various ratios with respect to one another.

Non-limiting examples of suitable acidic components are commercially available from BASF Corporation, under the trade name LUTROPUR®, such as LUTROPUR® MSA. In certain embodiments, the MSA is one which is formed by an air oxidation process, rather than from a chlorooxidation process. As such, the MSA has less metal content, such as less than 1 mg/kg, and little to no chloro compounds, which are generally corrosive. Other non-limiting examples of suitable acidic components are described in U.S. Pat. No. 6,531,629 to Eiermann et al. and in U.S. Pat. App. Pub. No. 2008/0161591 to Richards, the disclosures of which are incorporated herein by reference in their entirety to the extent that the disclosures do not conflict with the general scope of the present invention described herein.

In various embodiments, the acidic component is aqueous and such that the acid, e.g. MSA, is present in the acidic component in amounts of from about 35 to about 95, from about 50 to about 85, or from about 65 to about 85, or of about 70, parts by weight, each based on 100 parts by weight of the acidic component.

The acidic component is present in the composition in an amount of from about 0.01 to about 15, about 0.1 to about 15, about 1 to about 15, about 3 to about 15, about 5 to about 12.5, about 7.5 to about 12.5, about 8.7 to about 14.5, about 5, or about 10, parts by weight, each based on 100 parts by weight of the composition. Typically, the amounts described herein are based on the assumption that the acidic component includes 100% actives, i.e., 100% acid. As such, if the acidic component is aqueous, the amounts above can be adjusted accordingly to compensate for % actives dilution.

In a particular embodiment, the chelating component comprises MGDA and the acidic component comprises MSA. Without being bound or limited by any particular theory, it is believed that a synergy exists between the MGDA and MSA. Specifically, it was discovered that the combination of MGDA (e.g. $Na_3$.MGDA) and MSA has a surprising improvement in the dissolution of the scale than either component alone. It is believed that this unique property is a result of the ability of MSA to dissolve insoluble metal complexes, releasing metal ions where they are captured by the MGDA forming soluble salts. MGDA has a greater affinity for the soluble metal ions than MSA thus freeing the MSA to dissolve additional insoluble metal complexes until both molecules become saturated.

In certain embodiments, the acidic component ("A") and the chelating component ("C") are utilized in the composition in a molar ratio (C:A) of from about 6:1 to about 1:6, about 5:1 to about 1:5, about 4:1 to about 1:4, about 3:1 to about 1:3, about 2:1 to about 1:2, about 6:1 to about 1:1, about 5:1 to about 1:1, about 4:1 to about 1:1, about 3:1 to about 1:1, about 2:1 to about 1:1, or about 1:1.

Generally, the molar ratio will depend on the number of reactive groups on the chelating component. For example, MGDA has three carboxyl groups which can react with the acidic component (whereas GLDA has four). As such, one, two, or all three of these groups can be reacted with the acidic component, e.g. MSA. The MSA also protonates the amine group of the MGDA, and it is believed that this amine group is preferred over the carboxyl groups, i.e., it is preferentially protonated prior to any of the carboxyl groups. An excess of either component will generally just impart an unreacted amount of that component in the cleaning composition, such as free MSA. Such an excess can be used to shift pH of the composition and/or impart additional properties to the composition. It is believed that in certain embodiments, using a molar excess of the acidic component may cause undesirable precipitation of the chelating component (in a fully neutral form, e.g. crystals may form and settle out over time). As such, the molar ratio of these two components can be adjusted to account for the possible degree of reaction between the two.

The composition further comprises water. The water can be of various types. In certain embodiments, the water is demineralized. The water is present in the composition in various amounts, depending on the embodiment. The water can be added to the composition as a separate component. However, it is to be appreciated that some of the water can also be imparted by one of the other components, such as by the chelating component and/or acidic component when aqueous.

Typically, water is present in the composition in an amount of at least about 60, at least about 65, at least about 70, at least about 75, at least about 80, at least about 85, at least about 90, or at least about 95, parts by weight, each based on 100 parts by weight of the composition. In certain embodiments, the water is present in the remaining amount of parts by weight of the composition including the chelating component, the acidic component, and optionally, the surfactant and/or corrosion inhibitor components. In further embodiments, the compositions are substantially free to completely free of other conventional components, such as defoamers. The compositions of the present invention generally have excellent dissolution and/or inhibition properties without requiring supplemental components.

Optionally, the composition may further comprise a surfactant component. It is believed that in certain embodiments, including the surfactant component is useful for dissolving certain types of scales, such as rust. If employed, the surfactant component is typically selected from the group of nonionic surfactants, anionic surfactants, and ionic surfactants. It is to be appreciated that other types of surfactants can also be used. Examples of suitable surfactants, for purposes of the present invention, are described in US 2007/0034606 to Dietsche et al., the disclosure of which is incorporated herein by reference in its entirety to the extent it does not conflict with the general scope of the present invention.

In certain embodiments employing the surfactant component, the surfactant component comprises a nonionic surfactant. Non-limiting examples of suitable surfactant components are commercially available from BASF Corporation, under the trade name LUTENSOL®, such as LUTENSOL® XP 80, LUTENSOL® TO 8, LUTENSOL® GD 70; under the trade name TETRONIC®, such as TETRONIC® 304; under the trade name PLURAFAC®, such as PLURAFAC® LF 711; as well as under the trade name LUTENSIT®, such as LUTENSIT® AS 2230. It is to be appreciated that the surfactant component can include a combination of two or more different surfactants, e.g. a nonionic and an ionic surfactant.

If employed, the surfactant component is present in the composition in an amount of from about 0.01 to about 15, about 0.1 to about 15, about 1 to about 15 parts by weight, about 3 to about 15, about 5 to about 12.5, about 7.5 to about 12.5, about 8.7 to about 14.5, about 5 parts by weight, or about 10, parts by weight, each based on 100 parts by weight of the composition. Typically, the amounts described herein are based on the assumption that the surfactant component includes 100% actives, i.e., 100% surfactant. As such, if the surfactant component is aqueous, the amounts above can be adjusted accordingly to compensate for % actives dilution.

Optionally, the composition may further comprise a corrosion inhibitor. It is believed that in certain embodiments, including the corrosion inhibitor is useful for preventing redeposition of certain types of scales, such as rust. Various types of corrosion inhibitors can be used. In certain embodiments, the corrosion inhibitor is a propargyl alcohol alkoxylate.

Non-limiting examples of suitable corrosion inhibitors are commercially available from BASF Corporation, under the trade name KORANTIN®, such as KORANTIN® PP and KORANTIN® PM. It is to be appreciated that the composition can include a combination of two or more different corrosion inhibitors.

If employed, the corrosion inhibitor is present in the composition in an amount of from about 0.01 to about 5, about 0.1 to about 5, about 0.5 to about 1.5, or about 1, part(s) by weight, each based on 100 parts by weight of the composition. Typically, the amounts described herein are based on the assumption that the corrosion inhibitor includes 100% actives, i.e., 100% inhibitor. As such, if the corrosion inhibitor is aqueous, the amounts above can be adjusted accordingly to compensate for % actives dilution.

The composition typically has a pH of from about 0 to about 9, about 3 to about 9, about 5 to about 7, or about 6. The pH of the composition is imparted by the type and amount of components employed to form the composition. Suitable buffer systems, e.g. a phosphate buffer or a citrate buffer, can also be used for stabilizing the pH.

A few specific embodiments of the composition of the present invention are as follows, with parts in weight generally based on the assumption of 100% actives for each of the components, and with each of the components as exemplified and described above:

1) about 3 parts MGDA, about 3 parts MSA, remainder water;

2) about 3 parts MGDA, about 3 parts citric acid, remainder water;

3) about 8.7 parts MGDA, about 3 parts MSA, remainder water;

4) about 8.7 parts MGDA, about 5 parts MSA, remainder water;

5) about 8.7 parts MGDA, about 3 parts citric acid, remainder water;

6) about 8.7 parts MGDA, about 5 parts citric acid, remainder water;

7) about 3 parts MGDA, about 8.7 parts MSA, remainder water;

8) about 5 parts MGDA, about 8.7 parts MSA, remainder water;

9) about 5 parts MGDA, about 5 parts MSA, remainder water, optionally, with about 5 parts surfactant, and/or optionally, with about 0.5 parts corrosion inhibitor;

10) about 10 parts MGDA, about 10 parts MSA, remainder water, optionally, with about 10 parts surfactant, and/or with about 1 part corrosion inhibitor;

11) about 10 parts MGDA, about 10 parts of a blend of MSA and phosphoric acid, about 10 parts surfactant, about 1 part corrosion inhibitor, remainder water;

12) from about 0.1 to about 5 mmol MGDA, from about 100 to about 200 mmol MSA, remainder water; and 13) from about 0.1 to about 5 mmol MGDA, from about 100 to about 2000 mmol MSA, remainder water.

In the specific embodiments above, it is believed that 9) through 11) are especially useful for dissolution of corrosion/rust. It is believed that 1) through 8) are especially useful for dissolution of scales encountered in fertilizer evaporation systems. In further embodiments of 11), the blend of MSA and phosphoric acid can vary such that there is a greater amount of MSA relative to phosphoric acid, such that there are about equals parts of each, or such that is a lesser amount of MSA relative to phosphoric acid. In certain applications, use of MSA over that of phosphoric acid may be preferred as certain surfaces can discolor or dull with use of phosphoric acid. Typically, employing the corrosion inhibitor is useful for providing a cleaner and brighter looking surface, if desired. It is believed that 12) is especially useful for dissolution and/or inhibition of carbonate scaling, such as calcium carbonate. It is to be appreciated that the present invention is not limited to the specific embodiments numbered above.

The following examples, illustrating the method and compositions of the present invention, are intended to illustrate and not to limit the invention.

EXAMPLES

Compositions are prepared and tested in triplicate. The compositions are prepared by mixing the components of the composition in a vial. A sample of scale is weighed to determine an initial weight. The scale is representative of scale encountered during the collection and manufacture of fertilizer, and generally comprises calcium carbonate ($CaCO_3$), and may also include one or more additional compounds as well. The samples of scale are relatively of equal size and shape for each test. The sample is then placed in the vial such that the scale is in contact with the composition. The vial is then heated in an oven for four hours at a temperature of 80° C. The sample is then removed, rinsed with water, dried at 90° C., and reweighed to determine a final weight. The difference in weight indicates the amount of scale dissolved. Various compositions are illustrated in the tables below. All amounts are based on parts by weight, in grams, unless indicated differently. A "-" symbol means the data was not tested or available.

TABLE 1

| | Example | | | | | | | |
|---|---|---|---|---|---|---|---|---|
| Component | 1 | 2 | 3 | 4 | 5 | 6 | 7 | 8 |
| Chelating 1 | 0 | 1 | 3 | 0 | 0 | 8.7 | 8.7 | 11.7 |
| Acidic 1 | 3 | 3 | 3 | 5 | 5 | 5 | 5 | 5 |
| Water | 97 | 96 | 94 | 95 | 95 | 66.7 | 66.7 | 65.8 |
| pH | — | — | — | — | — | 6 | 6 | 8 |
| Time (hrs) | 4 | 4 | 4 | 4 | 4 | 4 | 4 | 4 |
| Temp (° C.) | 80 | 80 | 80 | 80 | 80 | 80 | 80 | 80 |
| Scale Dissolved (ave. %) | 25.5 ± 3.9 | 23.3 ± 8.2 | 29.3 ± 3.7 | 26.6 ± 1.0 | 22.3 ± 2.2 | 43.7 ± 5.1 | 44.4 ± 4.9 | 40.3 ± 5.3 |

Chelating 1 is MGDA, commercially available from BASF Corporation.

Acidic 1 is MSA, commercially available from BASF Corporation.

The amounts above and in Tables 2 through 5 below are based on active weight percentages of the components, as such, the amount of water includes water added to the composition as well as water imparted by the other components of the composition. For example, Chelating 1 includes about 40 percent actives (MGDA) and 60 percent water. As such, a portion of the water shown above is imparted by Chelating 1. Acidic 1 includes 70 percent actives (MSA) and 30 percent water.

As shown in Table 1 above, the combination of MGDA and MSA removes much more scale than either component alone.

Additional testing of other acidic components is performed. Results are illustrated bellow. As illustrated below, other acids also present synergies with MGDA.

TABLE 2

| Component | Example | | | | | | | |
|---|---|---|---|---|---|---|---|---|
| | 9 | 10 | 11 | 12 | 13 | 14 | 15 | 16 |
| Chelating 1 | 0 | 8.7 | 0 | 8.7 | 0 | 8.7 | 0 | 8.7 |
| Acidic 1 | 5 | 5 | 0 | 0 | 0 | 0 | 0 | 0 |
| Acidic 2 | 0 | 0 | 5 | 5 | 0 | 0 | 0 | 0 |
| Acidic 3 | 0 | 0 | 0 | 0 | 5 | 5 | 0 | 0 |
| Acidic 4 | 0 | 0 | 0 | 0 | 0 | 0 | 5 | 5 |
| Water | 95 | 86.3 | 95 | 86.3 | 95 | 86.3 | 95 | 86.3 |
| pH | — | 6 | — | 6 | — | 6 | — | 6 |
| Time (hrs) | 4 | 4 | 4 | 4 | 4 | 4 | 4 | 4 |
| Temp (° C.) | 80 | 80 | 80 | 80 | 80 | 80 | 80 | 80 |
| Scale Dissolved (ave. %) | 23.7 | 29.5 ± 7.0 | 19.8 ± 3.1 | 30.5 ± 2.2 | 34.8 ± 2.6 | 28.1 ± 3.4 | 9.1 ± 2.2 | 33.4 ± 7.1 |

Acidic 2 is $H_2SO_4$.
Acidic 3 is HCl.
Acidic 4 is citric acid.

Additional testing of MSA and MGDA is performed. The amount of MGDA is increased from 8.7 to 14.5 to vary the pH of the composition. Said another way, a pH is selected, and MGDA is added until the pH is reached. Water makes up the remainder of each of compositions. As illustrated below, scale removal peaks at a pH of 6.

TABLE 3

| Component | Example | | | | | |
|---|---|---|---|---|---|---|
| | 17 | 18 | 19 | 20 | 21 | 22 |
| Chelating 1 | 0 | 8.7-14.5 | 8.7-14.5 | 8.7-14.5 | 8.7-14.5 | 8.7-14.5 |
| Acidic 1 | 5 | 5 | 5 | 5 | 5 | 5 |
| Water | 95 | Rem. | Rem. | Rem. | Rem. | Rem. |
| pH | — | 3 | 5 | 6 | 7 | 9 |
| Time (hrs) | 4 | 4 | 4 | 4 | 4 | 4 |
| Temp (° C.) | 80 | 80 | 80 | 80 | 80 | 80 |
| Scale Dissolved (ave. %) | 18.0 ± 2.1 | 33.3 ± 5.6 | 37.2 ± 9.2 | 44.7 ± 8.7 | 41.8 ± 9.4 | 35.3 ± 0.9 |

Additional testing of other chelating components is performed. Results are illustrated below. As illustrated below, other chelating agents also present synergies with MSA. The chelating agents in Table 4 below are compared at equivalent molar basis. The pH is adjusted with NaOH (aq).

TABLE 4

| Component | Example | | | | | | | |
|---|---|---|---|---|---|---|---|---|
| | 23 | 24 | 25 | 26 | 27 | 28 | 30 | 31 |
| Chelating 1 | 0 | 8.7 | 8.7 | 0 | 0 | 0 | 0 | 0 |
| Chelating 2 | 0 | 0 | 0 | 8.2 | 0 | 0 | 0 | 0 |
| Chelating 3 | 0 | 0 | 0 | 0 | 12.2 | 0 | 0 | 0 |
| Chelating 4 | 0 | 0 | 0 | 0 | 0 | 16.1 | 0 | 0 |
| Chelating 5 | 0 | 0 | 0 | 0 | 0 | 0 | 9.6 | 0 |
| Chelating 6 | 0 | 0 | 0 | 0 | 0 | 0 | 0 | 2.5 |
| Acidic 1 | 5 | 0 | 5 | 5 | 5 | 5 | 5 | 5 |
| Water | 95 | 91.3 | 86.3 | 86.3 | 86.3 | 86.3 | 86.3 | 86.3 |

TABLE 4-continued

| | Example | | | | | | | |
|---|---|---|---|---|---|---|---|---|
| Component | 23 | 24 | 25 | 26 | 27 | 28 | 30 | 31 |
| pH | — | — | 6 | 6 | 6 | 6 | 6 | 6 |
| Time (hrs) | 4 | 4 | 4 | 4 | 4 | 4 | 4 | 4 |
| Temp (° C.) | 80 | 80 | 80 | 80 | 80 | 80 | 80 | 80 |
| Scale Dissolved (ave. %) | 20.1 ± 4.7 | 13.8 ± 1.8 | 31.9 ± 1.1 | 19.2 ± 1.3 | 18.6 ± 1.5 | 27.6 ± 2.4 | 24.6 ± 1.2 | 33.1 ± 3.4 |

Chelating 2 is EDTA, commercially available from BASF Corporation.

Chelating 3 is DTPA, commercially available from BASF Corporation.

Chelating 4 is HEDTA, commercially available from BASF Corporation.

Chelating 5 is GLDA, commercially available from AkzoNobel. Chelating 5 includes 47 percent actives (GLDA) and 53 percent water.

Chelating 6 is NTA, commercially available from BASF Corporation.

Additional testing of other pH is performed. The amount of MGDA and MSA is maintained, and the pH is varied by the addition of NaOH. Said another way, the pH is increased with the addition of NaOH. As illustrated below, scale removal peaks at the mid pH values. In addition, it is believed that scale removal is minimally dependent on the pH within the ranges illustrated below.

Acidic 5 is 85 wt. % phosphoric acid in water.

Surfactant 1 is a branched nonionic surfactant, specifically an alkyl polyethylene glycol ether having a degree of ethoxylation of 8, commercially available from BASF Corporation.

Corrosion Inhibitor 1 is 65-69 wt. % propargyl alcohol alkoxylate in water, commercially available from BASF Corporation.

Corrosion Inhibitor 2 is propargyl alcohol alkoxylate, commercially available from BASF Corporation.

Examples 39 and 40 have excellent rust removal relative to Example 38 which lacks a chelating component, with Example 40 providing brighter underlying metal relative to Example 39. Example 41 removes rust as well, but tends to discolor the underlying metal. Other examples also provide a level of rust removal. Additional acidic and surfactant components are tested, as illustrated in Table 7 below.

TABLE 5

| | Example | | | | | |
|---|---|---|---|---|---|---|
| Component | 32 | 33 | 34 | 35 | 36 | 37 |
| Chelating 1 | 0 | 8.7 | 8.7 | 8.7 | 8.7 | 8.7 |
| Acidic 1 | 5 | 5 | 5 | 5 | 5 | 5 |
| Water | 95 | 86.3 | 86.3 | 86.3 | 86.3 | 86.3 |
| pH | — | 3 | 5 | 6 | 7 | 9 |
| Time (hrs) | 4 | 4 | 4 | 4 | 4 | 4 |
| Temp (° C.) | 80 | 80 | 80 | 80 | 80 | 80 |
| Scale Dissolved (ave. %) | 18.5 ± 0.9 | 30.5 ± 2.8 | 35.0 ± 8.6 | 30.5 ± 3.9 | 29.5 ± 1.6 | 33.8 ± 4.5 |

Additional testing is performed similar to that illustrated above. In further compositions, surfactants and corrosion inhibitors are employed. Removal of corrosion/rust is tested. The compositions are illustrated in Tables 6 through 9 below.

TABLE 6

| | Example | | | | | | |
|---|---|---|---|---|---|---|---|
| Component | 38 | 39 | 40 | 41 | 42 | 43 | 44 |
| Chelating 1 | 0 | 10 | 10 | 10 | 10 | 0 | 10 |
| Chelating 6 | 0 | 0 | 0 | 0 | 0 | 10 | 0 |
| Acidic 1 | 10 | 10 | 10 | 0 | 5 | 10 | 10 |
| Acidic 5 | 0 | 0 | 0 | 8.5 | 4.25 | 0 | 0 |
| Surfactant 1 | 10 | 10 | 10 | 10 | 10 | 10 | 10 |
| Corrosion Inhibitor 1 | 0 | 0 | 1 | 0 | 0 | 1 | 0 |
| Corrosion Inhibitor 2 | 0 | 0 | 0 | 0 | 0 | 0 | 1 |
| Water | 80 | 70 | 69 | 71.5 | 70.75 | 69 | 69 |

TABLE 7

| | Example | | | | | |
|---|---|---|---|---|---|---|
| Component | 45 | 46 | 47 | 48 | 49 | 50 |
| Chelating 1 | 10 | 0 | 10 | 0 | 3 | 10 |
| Chelating 2 | 0 | 0 | 0 | 10 | 0 | 0 |
| Chelating 6 | 0 | 10 | 0 | 0 | 0 | 0 |
| Acidic 1 | 10 | 0 | 10 | 10 | 4 | 10 |
| Acidic 5 | 0 | 8.5 | 0 | 0 | 0 | 0 |
| Acidic 6 | 0 | 0 | 0 | 0 | 4 | 0 |
| Acidic 7 | 0 | 0 | 0 | 0 | 4 | 0 |
| Acidic 8 | 0 | 0 | 0 | 0 | 4 | 0 |
| Surfactant 1 | 0 | 10 | 0 | 0 | 0 | 0 |
| Surfactant 2 | 0 | 0 | 10 | 10 | 0 | 0 |
| Surfactant 3 | 0 | 0 | 0 | 0 | 4 | 0 |
| Surfactant 4 | 0 | 0 | 0 | 0 | 0 | 10 |
| Corrosion Inhibitor 1 | 1 | 0 | 1 | 1 | 1 | 1 |
| Water | 79 | 71.5 | 69 | 69 | 76 | 69 |

Acidic 6 is formic acid.

Acidic 7 is oxalic acid.

Acidic 8 is sulfamic acid.

Surfactant 2 is nonionic surfactant made from a saturated iso-$C_{13}$ alcohol and having a degree of ethoxylation of 8, commercially available from BASF Corporation.

Surfactant 3 is nonionic surfactant, specifically, an alkyl polyglucoside, commercially available from BASF Corporation.

Surfactant 4 is an ionic surfactant, specifically a sulfated ethoxylated fatty alcohol, commercially available from BASF Corporation.

Each of the compositions provides a level of rust removal. Ratios of acidic components, as well as another surfactant are tested, as illustrated in Tables 8 and 9 below, with the compositions in Table 9 being dilutions of those in Table 8. Rust removal is observed over the passage of time. In Table 8, each of the compositions has 10% actives of chelating agent, 10% actives acid, and 10% actives surfactant, if employed. Table 9 includes half the amount of actives. Each of the compositions provides a level of rust removal.

TABLE 8

| Component | Example | | | | | | | |
|---|---|---|---|---|---|---|---|---|
| | 51 | 52 | 53 | 54 | 55 | 56 | 57 | 58 |
| Chelating 1 | 10 | 10 | 10 | 10 | 10 | 10 | 10 | 10 |
| Acidic 1 | 14.3 | 0 | 7.15 | 10.73 | 3.58 | 14.3 | 14.3 | 14.3 |
| Acidic 5 | 0 | 11.76 | 5.9 | 2.94 | 8.82 | 0 | 0 | 0 |
| Surfactant 1 | 10 | 10 | 10 | 10 | 10 | 0 | 0 | 0 |
| Surfactant 3 | 0 | 0 | 0 | 0 | 0 | 0 | 14.3 | 0 |
| Surfactant 4 | 0 | 0 | 0 | 0 | 0 | 35.71 | 0 | 0 |
| Surfactant 5 | 0 | 0 | 0 | 0 | 0 | 0 | 0 | 10 |
| Corrosion Inhibitor 1 | 1 | 1 | 1 | 1 | 1 | 1 | 1 | 1 |
| Water | 64.7 | 67.24 | 65.95 | 65.33 | 66.6 | 38.99 | 60.4 | 64.7 |

Surfactant 5 is a low-foaming nonionic surfactant, commercially available from BASF Corporation.

TABLE 9

| Component | Example | | | | | | | |
|---|---|---|---|---|---|---|---|---|
| | 59 | 60 | 61 | 62 | 63 | 64 | 65 | 66 |
| Chelating 1 | 5 | 5 | 5 | 5 | 5 | 5 | 5 | 5 |
| Acidic 1 | 7.15 | 0 | 3.58 | 5.37 | 1.79 | 7.15 | 7.15 | 7.15 |
| Acidic 5 | 0 | 5.88 | 2.95 | 1.47 | 4.41 | 0 | 0 | 0 |
| Surfactant 1 | 5 | 5 | 5 | 5 | 5 | 0 | 0 | 0 |
| Surfactant 3 | 0 | 0 | 0 | 0 | 0 | 0 | 7.15 | 0 |
| Surfactant 4 | 0 | 0 | 0 | 0 | 0 | 17.86 | 0 | 0 |
| Surfactant 5 | 0 | 0 | 0 | 0 | 0 | 0 | 0 | 5 |
| Corrosion Inhibitor 1 | 0.5 | 0.5 | 0.5 | 0.5 | 0.5 | 0.5 | 0.5 | 0.5 |
| Water | 82.35 | 83.62 | 82.97 | 82.66 | 83.3 | 69.49 | 80.2 | 82.35 |

Additional compositions are prepared for testing removal of scale formed from calcium carbonate ($CaCO_3$). Small Carrara marble tiles (ca. 3 cm×1.5 cm×0.8 cm, l×w×d), formed from limestone, are rinsed with water and dried in an oven at 105° C. for at least one hour. The individual tiles are weighed and placed in numbered 2.5 ounce jars. A stock solution of 2.0 Molar (19.2%) MSA is prepared with D.I. water. The stock solution is used to prepare test solutions of MSA to which MGDA is added in concentrations of 0.1, 0.25, 0.5, 0.75, 1.0, 2.5, and 5.0 mmole. That is to say: to 100 g of the 2.0 Molar MSA solution, X grams of MGDA are added to reach the desired level of millimoles MGDA and the water is added to equal 200 g. The 200 g solution is divided into 50 g aliquots for the test, to which a preweighed tile is added to each numbered jar, as was 50 g of solution. The jars with loose caps are placed in an 80° C. oven for one hour. After one hour, the solutions are decanted and disposed, and the samples are thoroughly rinsed with tap water. The samples are dried for one hour at 105° C., allowed to cool completely, and reweighed to determine the weight loss of each tile. Table 10 below illustrates the average amount of scale dissolved from each of the compositions.

TABLE 10

| Component | Example | | | | | | | |
|---|---|---|---|---|---|---|---|---|
| | 67 | 68 | 69 | 70 | 71 | 72 | 73 | 74 |
| Chelating 1 (mmol) | 0 | 0.1 | 0.25 | 0.5 | 0.75 | 1 | 2.5 | 5 |
| Acidic 1 (Molar) | 1.0 | 1.0 | 1.0 | 1.0 | 1.0 | 1.0 | 1.0 | 1.0 |
| Water | Rem. | Rem. | Rem. | Rem. | Rem. | Rem. | Rem. | Rem. |
| pH | 0.45 | 0.45 | 0.45 | 0.45 | 0.47 | 0.48 | 0.47 | 0.47 |
| Scale Dissolved (ave. %) | 24.6 ± 0.7 | 25.6 ± 0.4 | 25.7 ± 0.4 | 25.6 ± 0.6 | 25.3 ± 0.5 | 23.3 ± 0.2 | 23.6 ± 0.1 | 22.3 ± 0.5 |

As shown in Table 10 above, the compositions have excellent dissolution properties, even at low concentrations, especially against calcium carbonate. Additional compositions are prepared for comparison between MGDA and GLDA in the removal of calcium carbonate scale. The compositions are prepared in the same manner as described above for the compositions of Table 10.

TABLE 11

| Component | Example | | | | | | |
|---|---|---|---|---|---|---|---|
| | 75 | 76 | 77 | 78 | 79 | 80 | 81 |
| Chelating 1 (mmol) | 0 | 0 | 0 | 0 | 0.05 | 0.10 | 0.25 |
| Chelating 5 (mmol) | 0 | 0.05 | 0.10 | 0.25 | 0 | 0 | 0 |
| Acidic 1 (Molar) | 1.0 | 1.0 | 1.0 | 1.0 | 1.0 | 1.0 | 1.0 |
| Water | Rem. | Rem. | Rem. | Rem. | Rem. | Rem. | Rem. |

TABLE 11-continued

| | Example | | | | | | |
|---|---|---|---|---|---|---|---|
| Component | 75 | 76 | 77 | 78 | 79 | 80 | 81 |
| Time (hrs) | 1 | 1 | 1 | 1 | 1 | 1 | 1 |
| Temp (° C.) | 80 | 80 | 80 | 80 | 80 | 80 | 80 |
| Scale Dissolved (ave. %) | 24.9 ± 0.2 | 24.7 ± 0.5 | 24.1 ± 0.3 | 24.1 ± 0.4 | 26.0 ± 0.5 | 24.5 ± 0.3 | 24.9 ± 0.6 |

As shown in Table 11 above, the compositions have excellent dissolution properties, even at low concentrations, especially against calcium carbonate.

In Tables 12 and 13 below, stability testing is illustrated for additional examples. The molar ratio of the acidic component ("A") to the chelating component ("C") is also illustrated. Example of the compositions is stored at −10° C. for 16 hours. The compositions are removed and allowed to warm to 25° C. for 8 hours and examined for crystal growth. The compositions are then returned to storage at −10° C. and the cycle is repeated. The number of cycles completed until crystal growth occurs is recorded and indicated in the tables.

TABLE 12

| | Example | | | | | | | | | |
|---|---|---|---|---|---|---|---|---|---|---|
| | 82 | | 83 | | 84 | | 85 | | 86 | |
| Component | grams | moles | grams | moles | grams | moles | grams | moles | grams | moles |
| Chelating 1 (40% actives) | 32.23 | 0.052 | 35.17 | 0.0519 | 35.12 | 0.0518 | 35.12 | 0.0518 | 39.37 | 0.0581 |
| Chelating 5 (47% actives) | 0 | 0 | 0 | 0 | 0 | 0 | 0 | 0 | 0 | 0 |
| Acidic 1 (70% actives) | 18.95 | 0.138 | 15.04 | 0.1096 | 12.02 | 0.0876 | 10.45 | 0.0761 | 10.69 | 0.0778 |
| Total | 54.18 | — | 50.21 | — | 47.14 | — | 45.57 | — | 50.06 | — |
| Molar Ratio (A:C) | — | 2.65 | — | 2.11 | — | 1.69 | — | 1.47 | — | 1.34 |
| pH | 2.03 | | 2.52 | | 3.02 | | 3.5 | | 4.01 | |
| Stability Cycles | 2 | | 1 | | 2 | | 5 | | >5 | |

TABLE 13

| | Example | | | | | | | | | |
|---|---|---|---|---|---|---|---|---|---|---|
| | 87 | | 88 | | 89 | | 90 | | 91 | |
| Component | grams | moles | grams | moles | grams | moles | grams | moles | grams | moles |
| Chelating 1 (40% actives) | 0 | 0 | 0 | 0 | 0 | 0 | 0 | 0 | 0 | 0 |
| Chelating 5 (47% actives) | 38.6 | 0.0517 | 38.72 | 0.0518 | 38.6 | 0.0517 | 38.63 | 0.0517 | 38.62 | 0.0517 |
| Acidic 1 (70% actives) | 27.3 | 0.1989 | 23.08 | 0.1681 | 19.94 | 0.1452 | 18.13 | 0.1321 | 16.55 | 0.1206 |
| Total | 65.9 | — | 61.8 | — | 58.54 | — | 56.76 | — | 55.17 | — |
| Molar Ratio (A:C) | — | 3.85 | — | 3.25 | — | 2.81 | — | 2.56 | — | 2.33 |
| pH | 2.03 | | 2.52 | | 3.02 | | 3.52 | | 4.02 | |
| Stability Cycles | 1 | | 2 | | >5 | | >5 | | >5 | | groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and It is to be understood that the appended claims are not limited to express and particular compounds, compositions, or methods described in the detailed description, which may vary between particular embodiments which fall within the scope of the appended claims. With respect to any Markush contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both singly and multiply dependent, is herein expressly contemplated.

What is claimed is:

1. A method of dissolving scale on a surface of a system, the surface of the system comprising a composite, a rubber, a plastic, and/or a ceramic, said method comprising the step of bringing the surface of the system into contact with a composition having a pH of from about 3 to about 9 and comprising:
   A) from about 0.001 to about 15 parts by weight of a chelating component
   comprising methylglycine-N—N-diacetic acid (MGDA) and/or an alkali salt thereof;
   B) from about 0.01 to about 15 parts by weight of an acidic component comprising methanesulfonic acid, said acidic component different than the chelating component A); and
   C) remainder parts by weight of water;
   wherein the parts by weight are based on 100 parts by weight of the composition.

2. A method as set forth in claim 1 wherein the composition further comprises a surfactant component D) present in an amount of from about 0.01 to about 15 parts by weight based on 100 parts by weight of the composition.

3. A method as set forth in claim 1 wherein the surfactant component D) is present in an amount of from about 0.01 to about 15 parts by weight based on 100 parts by weight of the composition.

4. A method as set forth in claim 1 wherein the scale comprises calcium carbonate.

5. A method of dissolving of scale on a surface of a system, the surface of the system comprising a composite, a rubber, a plastic, and/or a ceramic, said method comprising the step of bringing the surface of the system into contact with a composition having a pH of from about 3 to about 9 and comprising:
   A) from about 3 to about 15 parts by weight of a methylglycine-N—N-diacetic acid (MGDA) and/or an alkali salt thereof;
   B) from about 3 to about 15 parts by weight of methanesulfonic acid; and
   C) at least about 60 parts by weight of water;
   wherein the parts by weight are based on 100 parts by weight of the composition.

6. A method as set forth in claim 5 wherein the composition further comprises a surfactant component D) present in an amount of from about 3 to about 15 parts by weight based on 100 parts by weight of the composition and the surfactant component D) comprises a nonionic surfactant.

7. A method as set forth in claim 5 wherein the composition further comprises a corrosion inhibitor E) present in an amount of from about 0.01 to about 5 parts by weight based on 100 parts by weight of the composition and the corrosion inhibitor E) comprises a propargyl alcohol alkoxylate.

8. A method as set forth in claim 5 wherein the methylglycine-N—N-diacetic acid (MGDA) is present in an amount of from about 5 to about 12.5 parts by weight, the methanesulfonic acid is present in an amount of from about 5 to about 12.5 parts by weight, and a surfactant component D) is present in an amount of from about 5 to about 12.5 parts by weight, each based on 100 parts by weight of the composition.

9. A method as set forth in claim 5 wherein the scale is encountered in a fertilizer evaporation system.

10. A method of dissolving scale on a surface of a system, the surface of the system comprising a composite, a rubber, a plastic, and/or a ceramic, said method comprising the step of bringing the surface of the system into contact with a composition having a pH of from about 3 to about 9 and comprising:
    A) from about 3 to about 15 parts by weight of a chelating component selected from the group of;
       a1) methylglycine-N—N-diacetic acid (MGDA) and/or an alkali salt thereof,
       a2) nitrilotriacetic acid (NTA) and/or an alkali salt thereof,
       a3) hydroxyethylethylenediaminetriacetic acid (HEDTA) and/or an alkali salt thereof,
       a4) N,N-bis(carboxymethyl)-L-glutamate (GLDA) and/or an alkali salt thereof,
       a5) ethylenediaminetetraacetic acid (EDTA) and/or an alkali salt thereof,
       a6) diethylenetriaminepentaacetic acid (DTPA) and/or an alkali salt thereof, and
       a7) mixtures thereof;
    B) from about 3 to about 15 parts by weight of an acidic component comprising an alkylsulfonic acid, said acidic component different than the chelating component A); and
    C) at least about 60 parts by weight of water; and
    wherein the parts by weight are based on 100 parts by weight of the composition; and
    wherein the scale comprises ferrous phosphate, potassium fluorosilicate, potassium fluoride, and silica potassium hexafluorosilicate.

11. A method as set forth in claim 10 wherein the composition has a pH of from about 5 to about 7.

12. A method as set forth in claim 10 wherein the acidic component B) comprises citric acid.

13. A method as set forth in claim 10 wherein the acidic component B) comprises phosphoric acid.

14. A method as set forth in claim 10 wherein the chelating component A) comprises methylglycine-N—N-diacetic acid (MGDA) and/or an alkali salt thereof.

15. A method as set forth in claim 10 wherein the chelating component A) is present in an amount of from about 5 to about 12.5 parts by weight based on 100 parts by weight of the composition.

16. A method as set forth in claim 10 wherein the acidic component B) is present in an amount of from about 5 to about 12.5 parts by weight based on 100 parts by weight of the composition.

17. A method as set forth in claim 1 wherein the composition further comprises a corrosion inhibitor E) present in an amount of from about 0.1 to about 5 parts by weight based on 100 parts by weight of the composition.

18. A method as set forth in claim 10 wherein the surface of the system comprises iron, steel, aluminum, chromium, copper, or a combination thereof.

19. A method as set forth in claim 10 wherein the system is a heat-transfer system.

20. A method as set forth in claim 10 wherein the system is a filtration system.

21. A method as set forth in claim 10 wherein the system is an evaporation system.

22. A method as set forth in claim 10 further comprising the step of applying heat to the composition and/or the system to facilitate dissolution of the scale on the surface of the system.

23. A method as set forth in claim 10 wherein the scale is encountered in a fertilizer evaporation system.

24. A method as set forth in claim 1 wherein the alkylsulfonic acid is methanesulfonic acid.

25. A method as set forth in claim 24 wherein the methanesulfonic acid is formed by an air oxidation process.

26. A method as set forth in claim 24 wherein the acidic component B) further comprises phosphoric acid.

27. A method as set forth in claim 10 wherein the composition further comprises a surfactant component D) present in an amount of from about 3 to about 15 parts by weight based on 100 parts by weight of the composition.

28. A method as set forth in claim 27 wherein the surfactant component D) is a nonionic surfactant.

29. A method as set forth in claim 28 wherein the surfactant component D) is present in an amount of from about 5 to about 12.5 parts by weight based on 100 parts by weight of the composition.

* * * * *